Dec. 8, 1970          J. A. FREZZOLINI          3,546,576
BATTERY ANALYZER AND DISCHARGE DEVICE INCLUDING
MEANS FOR COMPARING THE BATTERY POTENTIAL
WITH A REFERENCE POTENTIAL
Filed Nov. 17, 1966
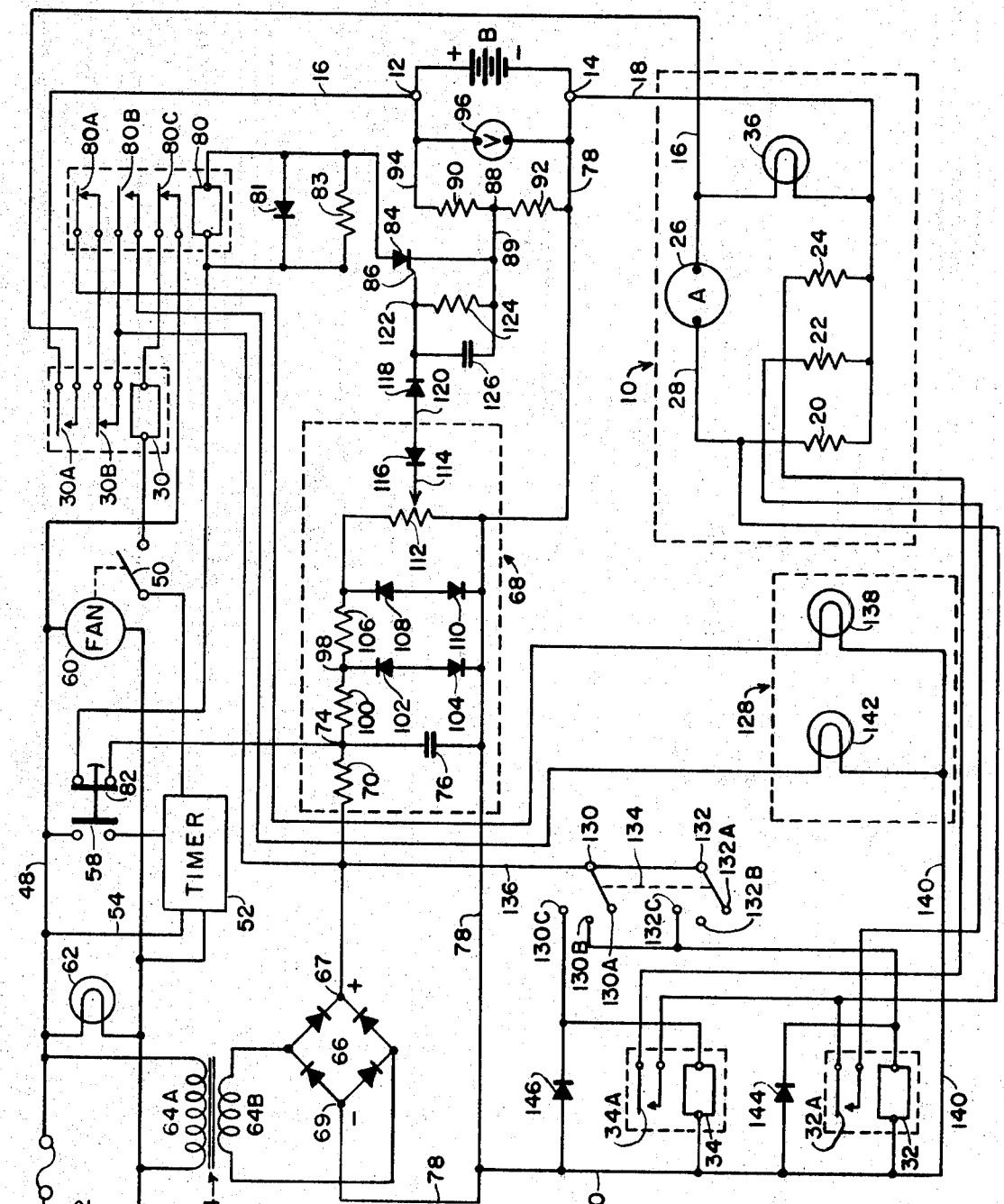
INVENTOR.
JAMES A. FREZZOLINI
BY
Attorney

United States Patent Office 3,546,576
Patented Dec. 8, 1970

3,546,576
BATTERY ANALYZER AND DISCHARGE DEVICE INCLUDING MEANS FOR COMPARING THE BATTERY POTENTIAL WITH A REFERENCE POTENTIAL
James A. Frezzolini, Bronx, N.Y., assignor, by mesne assignments, to Ogden Technology Laboratories, Inc., Farmingdale, N.Y.
Filed Nov. 17, 1966, Ser. No. 595,115
Int. Cl. G01n 27/46; G01r 11/44
U.S. Cl. 324—29.5          10 Claims

ABSTRACT OF THE DISCLOSURE

A battery analyzer comprising means for deriving a signal indicative of the battery potential, means deriving a reference signal of predetermined level but of opposite direction to the battery signal and control means to which the signals are connected, the control means being adapted to pass the reference signal only when the battery signal decreases below the level of the reference signal as a response to the decrease in the terminal potential of the battery.

---

This invention relates generally to the testing of batteries and, more particularly, pertains to a device for simultaneously discharging and analyzing a rechargeable battery to determine its acceptibility for use.

It is highly desirable to know the capacity capabilities of a rechargeable battery to determine its acceptability for use in a particular environment. In other words, if a battery loses charge at a rate which is in excess of an acceptable rate, the terminal voltage of the battery would fall below the rated voltage in a relatively short interval of time thereby rendering the battery useless and unfit for its intended use.

Accordingly, the desideratum of the present invention is to provide a battery discharger for discharging a battery and for determining the capacity capabilities of the battery.

A more particular object of the present invention is to provide a battery discharger for discharging a battery and for continuously monitoring the terminal voltage of the battery during such discharge cycle to determine if it fulfills its predetermined requirements.

Another object of the present invention resides in the novel details of circuitry which provide a battery discharger of the type described which is adapted to discharge and analyze batteries having different ratings.

In furtherance of the above objects, a battery discharger is provided having a pair of input terminals and a pair of output terminals. A source of potential is connected to the pair of input terminals and the pair of output terminals is adapted to be connected to the terminals of a battery. Individual load resistors are adapted to be connected across the pair of output terminals in accordance with the rating of the battery to discharge the same. Also connected to the pair of output terminals is a sensing means for sensing the output voltage of the battery and for comparing the same to a reference potential. Indicating means is also provided for indicating the acceptability or non-acceptability of the battery. That is to say, means are provided to notify an operator that the battery terminal voltage has fallen below an acceptable level and the battery is not acceptable for use. Additionally, a timer is utilized to time the discharge cycle so that the battery is discharged for a predetermined interval of time.

During the discharge cycle of the battery, the terminal voltage of the battery is continuously monitored by the sensing means. If the potential of the battery falls below a preselected level, the indicating means will be actuated to produce a signal to notify the operator that the battery is incapable of meeting its capacity requirements. On the other hand, if the terminal voltage of the battery remains above the preselected value during the discharge cycle, the indicating means will be operated at the termination of the discharge cycle to indicate that the battery is acceptable.

Additional objects and advantages of the present invention will be come more apparent from a consideration of the following detailed description when taken in conjunction with the accompanying drawing in which the single figure is a schematic circuit wiring diagram of a battery discharger constructed in accordance with the present invention.

In general, the battery discharger of the present invention comprises a discharge section for discharging a battery and an analyzing section for continuously monitoring the terminal voltage of the battery to determine if the battery meets specified requirements. The analyzing section includes a reference potential which is applied to a gate circuit. A portion of the battery terminal voltage is also applied to the gate circuit. If the portion of the terminal voltage of the battery applied to the gate circuit falls below the reference potential by a predetermined amount, the gate circuit will be actuated to illuminate an indicating device to notify the operator that the battery does not meet standard requirements.

More particularly, the discharge section of the present invention is designated generally by the reference numeral 10 in the single figure and is connected to a pair of output terminals 12 and 14 by respective leads 16 and 18. The output terminals 12 and 14 are adapted to be connected across the terminals of a battery B with the output terminal 12 connected to the anode or positive electrode of the battery and the output terminal 14 connected to the cathode or negative electrode of the battery.

Connected to the lead 18 is one terminal of respective load resistors 20, 22 and 24. The other terminal of the resistor 20 is connected to one terminal of an ammeter 26 by a lead 28. The other terminal of the ammeter 26 is connected to the lead 16 through the normally open contacts 30A of a relay 30. The other terminals of the resistors 22 and 24 are connected to the lead 28 through the normally open contacts 32A and 34A, respectively, of respective relays 32 and 34. Connected to the lead 18 between the ammeter 26 and the relay contacts 30A is a lamp 36. The ammeter 26 indicates the level of the discharge current.

It should be noted that the total load which may be connected with the battery B (through the leads 18, 16 and 28 and the relay contacts 30A) may have any one of three different values to discharge batteries having different ratings. For example, when it is desired to discharge a battery having a relatively low ampere-hour rating, the relay windings 32 and 34 are deenergized and only the resistor 20 will be connected between the leads 18 and 28. On the other hand, when it is desired to discharge a battery having an intermediate rating, the relay winding 32 is energized and resistors 20 and 22 are both connected to the line 28 thereby to draw a greater current from the battery B. In order to discharge a battery having a relatively high AH rating, both relay windings 32 and 34 may be energized in the manner indicated below so that all three resistors 20, 22 and 24 are connected in parallel. The value of the resistors 20–24 are chosen to obtain desired levels of discharge current in accordance with the ratings of the batteries the device of the present invention is adapted to discharge.

The lamp 36 is adapted to be illuminated by the battery B when the contacts 30A are closed to notify the operator that a battery is connected between the output terminals 12 and 14.

The battery analyzing portion of the present invention includes a pair of input terminals 38 which are adapted to be connected with an energizing source 40. The energizing source 40 may take the form of conventional AC house current, in which case the input terminals 38 may be connected with a conventional male plug which is adapted to be received in a conventional female socket.

The input terminals 38 are connected to the armatures of a double-pole single-throw switch 42. One terminal of the switch 42 is connected to one end of normally closed contacts 80C of a relay 80, through a fuse 46, by a lead 48. The relay contacts 80C are adapted to be opened when the relay winding is energized. Connected between the other end of the relay contacts 80C and one terminal of a condition responsive switch 50 is the relay winding 30. The other terminal of the switch 50 is connected to an output terminal of a timer 52. The input terminals of the timer 52 are connected to the lead 48 by a lead 54 and to the other terminal of the double-pole single-throw switch 42 by a lead 56 respectively. The timer 52 is also connected to the lead 48 through a normally open reset push button switch 58. The timer 52 is of conventional design and is commercially available. The timer is adapted to energize the relay winding 30 for a preselected interval of time upon the momentary closure of the reset switch 58. In other words, a discharge cycle is initiated by closing momentarily the switch 58.

The switch 50 is adapted to be closed in response to the operation of a cooling fan 60 which is connected between the lead 56 and the lead 48 and which is adapted to cool the load resistors in the discharge section 10 of the invention. On the other hand, if the fan is inoperative the switch 50 will remain deenergized and the battery B will remain disconnected from the load resistors because of the open contacts 30A. Also connected between the leads 56 and 48 is a pilot lamp 62 which is adapted to be illuminated when the switch 42 is closed to notify the operator that power has been applied to the battery discharge of the present invention.

Connected across the leads 48 and 56 is the primary winding 64A of a transformer 64. The secondary winding 64B of the transformer 64 is connected to the input terminals of a full-wave diode bridge rectifier 66 having a positive output terminal 67 and a negative output terminal 69. The diode bridge 66 is connected to a reference signal network which is enclosed within a dotted line box and is designated generally by the reference numeral 68. The reference signal network is operable to produce a reference signal of constant amplitude and to apply the same to a comparing device in the form of a silicon controlled rectifier 84. The rectifier 84 is adapted to compare the reference signal with the battery terminal voltage and to produce an appropriate indication if the terminal voltage falls below the reference signal by a preselected potential to notify the operator that the battery is not acceptable for use.

More specifically, the reference signal network 68 includes a resistor 70, one end of which is connected to the positive output terminal 67 of the rectifier 66. Connected to the other end of the resistor 70 and defining a junction 74 therewith is a resistor 100. The other end of the resistor 100 is connected to a junction point 98.

Connected between the junction 98 and a return lead 78 is a series circuit comprising a Zener diode 102 and a diode 104. The lead 78 is connected to the negative output terminal 69 of the bridge 66. The Zener diode is polarized so that the cathode electrode of the Zener diode is connected to the junction 98 and the cathode electrode of the diode 110 is connected to the lead 78. The anode electrodes of the diodes 102 and 104 are connected together. Also connected to the junction 98 is one end of a resistor 106. Connected between the other end of the resistor 106 and the lead 78 is another series circuit comprising a Zener diode 108 and a diode 110. The diodes are polarized so that the cathode electrode of the diode 108 is connected to the resistor 106 and the cathode electrode of the diode 110 is connected to the lead 78. The anode electrodes of the diodes 108 and 110 are connected together. Connected with the ends of the series circuit comprising the Zener diode 108 and the diode 110 are the ends of a potentiometer 112 having a movable arm 114.

The arm 114 is connected to the gate electrode 86 of the silicon controlled rectifier 84, through a Zener diode 116 and a diode 118 by a lead 120. The diodes are polarized so that the cathode electrode of the diode 116 is connected to the arm 114 and the cathode electrode of the diode 118 is connected to the gate electrode 86. The connection between the cathode electrode of the diode 118 and the gate electrode 86 defines a junction 122. Connected between the junction 122 and the cathode electrode of the silicon controlled rectifier 84 is a parallel circuit comprising a resistor 124 and a capacitor 126.

The cathode electrode of the silicon controlled rectifier is returned to the common or return lead 78 through a lead 89 and a resistor 92. It will be obvious from the above description that the Zener diodes 102 and 108 will be back-biased and the diodes 104 and 110 will be forward biased. Accordingly, a constant potential will appear across the diodes 108 and 110 in the conventional manner. It is also to be noted that the Zener diode 116 will be back-biased and the diode 118 will be forward biased. Since the voltage drops across these diodes are constant, the signal appearing between the junction 122 and the lead 78 and, therefore, the cathode electrode of the silicon controlled rectifier 84 will be constant in amplitude. Moreover, the value or amplitude of this reference signal may be varied by moving the arm 114 of the potentiometer for reasons which will readily become apparent from a consideration of the discussion below.

Connected to the junction 74 of the resistors 70 and 100 in the reference signal network 68, through a normally closed push-button switch 82, is one end of a relay winding 80. The push-button switch 82 is ganged to the switch 58 so that initation of the discharge cycle by depressing the switch 58 simultaneously causes the switch 82 to open thereby to reset the decision network portion of the circuit, as noted in detail below. The other end of the relay winding 80 is connected to the anode electrode of the silicon controlled rectifier 84. Connected in parallel with the relay winding 80 is a diode 81 and a resistor 83. Also connected to the junction 74 and to the lead 78 are the respective ends of a blocking capacitor 76.

As noted hereinabove, the cathode electrode of the silicon controlled rectifier 84 is connected to one end of the resistor 92, at a junction 88, by the lead 89. Also connected to the junction 88 is one end of a resistor 90. The other ends of the resistors 90 and 92 are connected to the output terminals 12 and 14 by respective leads 94 and 78. The resistors 90 and 92 form a voltage divider network so that a portion of the terminal voltage of the battery B appears at the junction 88. Additionally, a voltmeter 96 is connected across the leads 94 and 78 to indicate the terminal voltage of the battery.

It will now be appreciated from the foregoing discussion that the potential appearing between the junction 122 and the lead 89 will be dependent upon the amplitude of the reference signal produced by the reference signal network 68 and the signal applied therebetween from the voltage divider network comprising the resistors 90 and 92. (For ease of reference, the latter signal will be referred to hereinafter as the battery signal.) That is the reference signal produces a biasing voltage between the gate and cathode electrodes of the silicon controlled rectifier 84 which is in a direction to fire the same. On the other hand, the battery signal produces a reverse biasing voltage between the gate and cathode electrodes of the silicon controlled rectifier which is in a direction which would prevent the firing of the same.

Initially, the arm 114 of the potentiometer 112 is set so that the amplitude of the reference signal is insufficient to cause the silicon controlled rectifier 84 to fire when the terminal voltage of the battery B is within an acceptable range. Moreover, the acceptable range of terminal voltage is chosen to be sufficiently broad so that the terminal voltage of the battery is still within the range limits at the termination of the discharge cycle.

However, if the potential of the battery B falls below the limit of the acceptable range, the reverse bias between the gate and cathode electrodes due to the battery signal will decrease. Hence, the forward bias due to the reference signal will cause the silicon controlled rectifier 84 to fire. When the silicon controlled rectifier 84 fires the relay winding 80 will be connected between the output terminals of the diode bridge rectifier 66 through the rectifier 84. Hence, the relay 80 will be energized to cause the contacts 80C to open. The operation of the contacts 80C will disconnect the relay winding 30 from the source 40 thereby causing the relay contacts 30A to open and to disconnect the battery B from the load resistors. Thus, the discharge cicle automatically will be terminated when the battery terminal voltage falls to an unacceptable level. Additionally, the energization of the relay winding 80 and the consequent deenergization of the relay winding 30 cause the operation of a decision network, which is designated generally by the dashed line box 128, to provide an indication that the battery is not acceptable.

More particularly, the decision network 128 includes normally closed contacts 30B of the relay 30, one end of which is connected to the positive output terminal 67 of the bridge rectifier 66 through series connected ganged armatures 130 and 132 of a double-pole triple-throw switch 134 by a lead 136. The other end of the contacts 30B is connected to one end of a lamp 138, through normally closed contacts 80A of the relay 80. The other end of the lamp 138 is connected to the lead 78 by a lead 140. A second lamp 142 is connected to the lead 136 intermediate the switch 134 and the contacts 30B through normally open contacts 80B of the relay 80. The other end of the lamp 142 is connected to the lead 140.

When the relay winding 80 is energized, in the above-described manner, the contacts 80B close thereby to connect the lamp 142 across the output terminals 67 and 69 of the bridge rectifier 66 via the leads 136, 140 and 78 to illuminate the same. Thus, it will be apparent that the illumination of the lamp 142 provides a visual indication that the terminal voltage of the battery B has fallen below the required output voltage. Therefore, the operator is notified that the battery is not fit for its intended use and it should be replaced. As a feature of the present invention, it should be noted that the operator is not required to wait until the entire discharge cycle has terminated to determine the condition of the battery since he immediately is notified that a battery is not acceptable. Thus, the device of the present invention results in a great savings in time and, therefore, in the cost of operating such apparatus.

The relay 80 may be deenergized manually by depressing the push button switch 82 or the switch 58 which is ganged thereto thereby breaking the connection between the relay winding 80 and the bridge rectifier 66 to reset the decision network 128.

On the other hand, if the battery terminal voltage remains within the acceptable range noted above, the silicon controlled rectifier will remain nonconducting and the relay winding 80 will remain deenergized. Thus, the relay contacts 80A will remain closed and, during the discharge cycle, the relay winding 30 will be energized to maintain the relay contacts 30B open. However, at the termination of the discharge cycle, the relay winding 30 will be deenergized to allow the relay contacts 30B to assume their normally closed state. The bridge rectifier will then supply current to the lamp 138 through the leads 136, 140 and 78 and the contacts 30B and 80A to illuminate the same. Accordingly, the lamp 138 provides a visual indication that the battery B has met capacity requirements and that the battery is acceptable.

The switch 134 controls the connection of the load resistors 22 and 24 across the output terminals 12 and 14 in accordance with the rating of the battery. Each of the armatures 130 and 132 is provided with three terminals 130A, 130B and 130C, and 132A, 132B and 132C, respectively. Terminals 132A and 132B of the armature section 132 of the switch 134 are unconnected. However, the terminal 132C is connected to one end of the relay winding 32. The other end of the winding 32 is connected to the lead 140. A diode 144 is connected in parallel with the relay winding 32.

Switch contact 130A of the armature section 130 of the switch 134 is unconnected. Terminal 130B, however, is connected to the winding 32. Terminal 130C is connected to one end of relay winding 34, the other end of which is connected to the lead 140. A diode 146 is connected in shunt with the relay winding 34.

When the ganged armatures 130 and 132 of the switch 134 are connected to the terminals 130A and 132A, respectively, the relay windings 32 and 34 will be deenergized and only the load resistor 20 will be connected across the leads 28 and 18. However, when the armatures are connected with the terminals 130B and 132B, respectively, the winding 32 will be connected across the bridge rectifier 66 through the leads 136, 140 and 78 thereby to close the contacts 32A and connect both the load resistors 20 and 22 across the leads 28 and 18. However, if the battery B has a very high ampere-hour rating, then the armatures 130 and 132 will be connected to the respective terminals 130C and 132C thereby to energize the windings 32 and 34. Hence, both sets of contacts 32A and 34A will close to connect all three load resistors 20, 22 and 24 across the leads 28 and 18.

It is to be noted that two sets of leads are connected to the respective output terminals 12 and 14. That is, leads 16 and 94 are connected to the output terminal 12 and leads 18 and 78 are connected to the output terminal 14. This arrangement is utilized so that the leads 78 and 94, which sense the terminal voltage of the battery B, do not measure the voltage drop in the leads 16 and 18. To put this another way, if only one lead were connected to each of the output terminals 12 and 14, there would be voltage drop in these leads. Thus, the portion of the battery signal applied to the junction 122 would be less than the terminal voltage of the battery due to the voltage drop in the connecting leads. Hence, the lamp 142 may very well be illuminated to signal that a battery is not acceptable even though the actual terminal voltage of the battery is still with the acceptable range of voltages.

It is believed that the operation of the present device will be clearly understood from a consideration of the foregoing discussion. However, the operation will be briefly summarized below.

Accordingly, in operation, a battery B is connected between the output terminals 12 and 14 with the positive terminal of the battery connected to the terminal 12 and the negative terminal of the battery connected to output terminal 14. The switch 42 is closed to connect the source of potential 40 with the battery discharger thereby illuminating the lamp 62 and energizing the fan 60. It is to be noted that the contacts 30A are connected in series with the ammeter 26 and the output terminal 12 of the discharger. Accordingly, the battery B will remain disconnected from the load resistors until the relay winding 30 is energized thereby to close the relay contacts 30A. The relay winding 30 is energized by the timer 52 through the interlock switch 50, as noted above. Accordingly, the battery B will not be connected with the load resistor until the fan 60 is operating whereupon the switch 50 will be closed.

Prior to initiation of a timing cycle, the switch 134 is operated to connect the required resistors between the leads 18 and 28 in accordance with the ampere-hour rating of the battery B. That is, the armatures 130 and 132 will be connected to one of their respective three terminals so that the relay windings 32 and/or 34 or none of these windings will be energized to provide the proper load for the battery B.

The timer 52 is then actuated, by operation of the reset button 58, to initiate a timing interval which maintains the relay winding 30 energized for a preselected amount of time and at the end of such interval, deenergizes the relay winding. In other words, the battery B is connected to the load resistors through the contacts 30A of the relay 30 for the aforementioned preselected interval of time. Additionally, the operation of the switch 58 automatically operates the switch 82 which is ganged therewith to reset the decision network 128.

When the contacts 30A close, the lamp 36 will be illuminated to signify that a battery has been connected to the terminals 12 and 14. Additionally, the potential between the junction 122 and the lead 78 will be determined by the value of the reference signal and the amplitude of the battery signal in the manner noted above. If, during the discharge cycle of the battery, the terminal potential of the battery falls below the acceptable level, the silicon controlled rectifier 84 will be fired thereby to provide a path for current flow through the relay winding 80.

When the relay winding 80 is energized, the contacts 80A and 80C will open and the contacts 80B will close thereby to connect the lamp 142 across the output terminals of the bridge rectifier 66, through the leads 136, 140 and 78 to illuminate the same. The illumination of the lamp 142 indicates that the battery B is incapable of holding a specified charge for the preselected interval of time and should be discarded. Additionally, the relay winding 30 will be deenergized to cause contacts 30A to open and terminate the discharge cycle by disconnecting the battery B from the load resistors 20-24.

On the other hand, if the terminal voltage of the battery B remains within the preselected acceptable range of terminal voltages until the termination of the discharge cycle, the relay winding 80 will remain deenergized and the relay contact 80A will remain closed. When the timer 52 deenergizes the relay winding 30, the relay contacts 30B will close. This action will cause the lamp 138 to be connected across the output terminals of the bridge rectifier 66 through the leads 136, 140 and 78 thereby to illuminate the lamp 138. The illumination of the lamp 138 signifies that the battery meets all specifications and that the battery may be recharged.

Accordingly, a battery discharger has been provided for discharging a battery and for continuously analyzing the same to determine if the battery meets its capacity requirements.

What is claimed is:

1. A battery analyzer having a first circuit comprising control means including a Zener diode network adapted to pass a signal in a predetermined direction at a predetermined level and an independent source of direct current comprising an A.C. source, said first circuit providing a reference signal indicative of the potential of said independent source at least equal to the predetermined direction and level of said control means, a second circuit comprising the battery, discharge means for simultaneously placing a load thereon, a relay for selectively connecting and disconnecting said discharge means from said second circuit, a timer for operating said relay in either state for a predetermined interval of time, and said control means, said second circuit providing during the connected interval a battery signal proportional to the terminal voltage of said battery, said second circuit being so arranged that said battery signal is of opposite direction to said reference signal to permit passage of said reference signal to said control means only when said battery signal is below the level of said reference signal and, indicating means comprising a first signalling means, a source of energy for operating said first signalling means, and a relay connected between said first signalling means and said source of energy and being operable on passage of a signal through the control means for connecting said source of energy with said first signalling means to indicate the inoperability of the battery.

2. The analyzer according to claim 1 wherein said discharge means is adjustable to provide selective predetermined load on the battery.

3. A battery analyzer in accordance with claim 1 in which said control means includes a silicon controlled rectifier having an anode electrode, a cathode electrode and a gate electrode, means for connecting said silicon controlled rectifier within the first circuit so that said reference signal is applied between said gate and cathode electrodes, means for connecting said silicon controlled rectifier within the second circuit so that said battery signal is applied between said gate and cathode electrodes, whereby said silicon controlled rectifier is caused to be fired only when the terminal voltage of the battery decreases below said predetermined level.

4. The battery analyzer according to claim 1 in which the indicating means further includes second signalling means, means for connecting said signalling means to said source of energy, a second relay operable in response to the termination of the discharge means to connect said source of energy with said second signalling means thereby indicating the operability of the battery, the first mentioned relay including contact means between said second signalling means and said source of energy for preventing the connection of said second signalling means with said source of energy when said first relay is operated by passage of a signal through said control means.

5. The analyzer apparatus according to claim 1 wherein the discharge means includes a plurality of resistors, and switch means for connecting preselected ones of said plurality of resistors across said output terminals in accordance with the rating of a battery to be connected thereto.

6. A battery analyzer according to claim 1 including a voltmeter connected in parallel with the battery and an ammeter connected serially between the battery and the discharge means, said ammeter and said voltmeter being adapted to respectively monitor the discharge current of the signal applied thereto.

7. Battery discharging and analyzing apparatus including a pair of input terminals and a pair of output terminals,
 lead means for connecting each one of said pair of output terminals to the respective terminals of a battery,
 discharge means connected to said pair of output terminals for discharging a battery connected to said pair of output terminals,
 disconnect means operable from a first state in which said disconnect means disconnects said discharge means from at least one of said pair of output terminals to a second state in which said disconnect means connects said discharge means with said one of said pair of output terminals,
 a source of potential connected across said pair of input terminals,
 timing means connected between said input terminals and said disconnect means for applying said source of potential to said disconnect means for a predetermined interval of time to operate said disconnect means to said second state,
 indicating means operable from a first state to a second state to indicate the condition of a battery connected to said pair of output terminals,
 and control means connected to said indicating means and adapted to be connected to the respective terminals of a battery and being responsive to the decrease in terminal voltage of the battery below a preselected level to cause the operation of said indicating means to said second state,
 whereby the condition of the battery is indicated by said indicating means.

8. Battery discharging and analyzing apparatus as in claim 7.
in which said indicating means includes first signalling means operable to indicate that a battery is not acceptable,
a source of energy for operating said first signalling means,
a two-state device,
and lead means for connecting said source of energy, said two-state device and said control means in a series loop,
said control means being operable to connect said source of energy with said two-state device,
said two-state device including contact means operable from a first state to a second state when said two-state device is energized to connect said source of energy to said first signalling means,
whereby said indicating means is in the second state.

9. Battery discharging and analyzing apparatus as in claim 8,
in which said indicating means further includes second signalling means operable to indicate that a battery is accepable,
said disconnect means including means to connect said second signalling means with said source of energy when said timing means disconnects said source of potential from said disconnect means after said predetermined interval of time, whereby said indicating means resides in said first state,
said two-state device including means between said second signalling means and said source of energy for disconnecting said source of energy from said second signalling means when said two-state device is operated to said second state.

10. Battery discharging and analyzing apparatus as in claim 7,
including cooling means for cooling said discharge means,
and interlock means connected between said disconnect means and said timer for opening the circuit between said timer and said disconnect means when said cooling means is inoperative.

References Cited

UNITED STATES PATENTS

| | | | |
|---|---|---|---|
| 1,922,792 | 8/1933 | Cain | 324—29.5 |
| 2,229,009 | 1/1941 | Berry | 324—29.5 |
| 2,267,826 | 12/1941 | Heyer | 324—29.5 |
| 2,270,554 | 1/1942 | Pugh | 324—29.5X |
| 2,758,275 | 8/1956 | Medlar | 324—29.5 |
| 3,017,570 | 1/1962 | Floyd | 324—29.5 |
| 3,060,374 | 10/1962 | Strain | 324—29.5 |
| 3,171,032 | 2/1965 | Holt | 340—248AUX |
| 3,277,312 | 10/1966 | Harris | 340—248AUX |
| 3,356,939 | 12/1967 | Stevenson | 324—51 |

OTHER REFERENCES

O'Malley, F. L.: "Voltage Detection Circuit," IBM Technical Disclosure Bulletin, vol. 3, No. 6, November 1960, p. 37.

GERARD R. STRECKER, Primary Examiner

U.S. Cl. X.R.

340—249